United States Patent [19]

Trigiante

[11] Patent Number: 5,961,879
[45] Date of Patent: Oct. 5, 1999

[54] PROCESS FOR THE MANUFACTURE OF HYPOCHLORITE BLEACHING COMPOSITIONS

[75] Inventor: Giuseppe Trigiante, Via Castinelli, Italy

[73] Assignee: Procter & Gamble Company, Cincinnati, Ohio

[21] Appl. No.: 08/952,230

[22] PCT Filed: Apr. 19, 1996

[86] PCT No.: PCT/US96/05601

§ 371 Date: Nov. 17, 1997

§ 102(e) Date: Nov. 17, 1997

[87] PCT Pub. No.: WO96/36559

PCT Pub. Date: Nov. 21, 1996

[30] Foreign Application Priority Data

May 16, 1995 [EP] European Pat. Off. ............. 95870056

[51] Int. Cl.[6] ............................ C01B 11/06; C01G 1/00; C01G 45/00; C01G 49/00
[52] U.S. Cl. .............................. 252/187.25; 252/187.26; 423/473; 423/140; 423/50; 423/55; 423/34
[58] Field of Search ...................... 252/187.24, 187.25, 252/187.26; 423/473, 34, 50, 55, 140

[56] References Cited

U.S. PATENT DOCUMENTS

| | | | |
|---|---|---|---|
| 2,438,781 | 3/1948 | Kamlet | 23/86 |
| 2,662,858 | 12/1953 | Brandon | 252/187.25 |
| 3,557,010 | 1/1971 | Skrypa et al. | 252/187.25 |
| 3,755,179 | 8/1973 | Fitzgerald, Jr. | 252/187.24 |
| 3,998,751 | 12/1976 | Murray | 8/111 |
| 4,445,935 | 5/1984 | Posey et al. | 423/34 |
| 4,561,994 | 12/1985 | Rubin et al. | 252/187.23 |
| 4,780,303 | 10/1988 | Dugua | 423/473 |
| 4,857,292 | 8/1989 | Brahm et al. | 423/473 |
| 4,898,681 | 2/1990 | Burton | 252/187.25 |
| 5,380,458 | 1/1995 | Douglass | 252/186.36 |

*Primary Examiner*—Joseph D. Anthony
*Attorney, Agent, or Firm*—Richard S. Echler, Sr.; Kim W. Zerby; Jacobus C. Rasser

[57] ABSTRACT

The present invention discloses a process for the manufacture of liquid aqueous bleaching compositions comprising hypochlorite, a strong source of alkalinity and water, said process comprising the steps of: mixing said alkali metal hypochlorite, said strong source of alkalinity and said water, adding a precipitating agent, or mixtures thereof; and thereafter separating the precipitates formed from said composition. The compositions provided by the process according the present invention are substantially free of heavy metal ions, thereby providing improved whiteness performance and/or fabric safety performance.

20 Claims, No Drawings

PROCESS FOR THE MANUFACTURE OF HYPOCHLORITE BLEACHING COMPOSITIONS

This application is an application filed under 35 USC § 371 of PCT/US96/04601 filed Apr. 19, 1996.

TECHNICAL FIELD

The present invention relates to a process for the manufacture of a liquid bleaching composition which is suitable for laundry applications including handwashing as well as washing with automatic washing machines.

BACKGROUND OF THE INVENTION

Liquid bleaching compositions are well known in the art. Amongst the different bleaching compositions available, those relying on bleaching by hypochlorite are often preferred.

However, the drawbacks associated with the use of chlorine-based compositions are that said compositions may both damage and yellow fabrics.

We have now found that the whiteness performance and/or the fabric safety performance of a liquid aqueous hypochlorite-containing composition is mainly dependent on two factors: the pH of the bleaching environment and the presence of heavy metal ions in said bleaching environment.

It is believed that higher pH of the bleaching environment is beneficial for the whiteness and fabric safety performance because it shifts the chemical equilibrium between hypochlorite and hypochlorous acid to reduce the level of hypochlorous acid, the species which we have found to be the most responsible for the yellowing and the fabric damage.

The presence of heavy metal ions such as Ni, Co, Cu, Mn, Cr, and Fe adversely affects the hypochlorite bleaching performance. It is believed that in the washing environment said heavy metal ions catalyze the attack of hypochlorous acid on fabrics with the generation of yellow oxidized species. Said heavy metal ions also lead to reduced tensile strength of the fabrics, thereby reducing fabric resistance. It is further believed that said heavy metal ions are adsorbed per se on oxidized fabrics as colored species and catalyze the degradation of the brighteners adsorbed on fabrics generating thereby highly colored species on fabrics. Also, said heavy metal ions stabilize colored pigments of enzymatic stains such as blood or grass. Furthermore, it is believed that said heavy metal ions are detrimental for the performance of a hypochlorite composition as they tend to react with the hypochlorite present in said composition and thereby catalyze the decomposition of said hypochlorite.

In the current industrial manufacturing processes, liquid aqueous compositions comprising hypochlorite and a source of alkalinity, such as sodium hydroxide, are prepared by using the cheapest and most commonly available raw materials. Such commercially available raw materials are usually contaminated by impurities such as heavy metal ions. For example, the commercially available hypochlorite commonly used may contain proportions of other materials such as sodium carbonate and/or caustic soda and/or heavy metal ions. Also, the current caustic soda is commonly contaminated by heavy metal ions such as iron.

More particularly, in the current industrial manufacturing processes, such liquid aqueous compositions comprising hypochlorite are prepared by diluting a concentrated hypochlorite solution with tap water, i.e. non-demineralized water, in presence of said source of alkalinity, allowing precipitation of insoluble salts, such as metal hydroxides and metal carbonates, and finally removing said insoluble salts from said compositions. However, the compositions obtained are not satisfactory as regard their purity, because they still contain a certain level of heavy metal ions which have not been retained/eliminated by a conventional separation means like by filtering said compositions with a decantation filter. The amount of heavy metal ions in the finished composition is even higher when manufacturing a liquid aqueous composition comprising hypochlorite at high pH values such as 13 and above. Indeed, the solubility of most of the heavy metal ions that should be eliminated in order to ensure good whiteness and/or fabric safety performance, increases with the pH of the composition. Also the separation step, e.g. the filtration step, is quite a long operation, i.e. it is the most time consuming step in the overall manufacturing process of hypochlorite-containing compositions.

We have now found that it is essential that the levels of heavy metal ions are controlled in the liquid aqueous hypochlorite-containing compositions per se, thereby providing improved whiteness performance and/or fabric safety performance when treating fabrics with such compositions.

It is therefore an object of the present invention to provide a process for the manufacture of liquid aqueous compositions comprising hypochlorite and a strong source of alkalinity, said compositions having a particularly low content of heavy metal ions, therefore exhibiting improved whiteness and/or fabric safety performance.

It is a further object to provide such a process for the manufacture of liquid aqueous hypochlorite-containing compositions at overall reasonable costs, e.g. to provide compositions exhibiting improved whiteness and/or fabric safety performance by a process wherein the raw materials used are the cheapest and most commonly available commercially.

It has now been found that a particularly efficient control of the heavy metal ions can be achieved by using a manufacturing process where a precipitating agent is added to hypochlorite and a strong source of alkalinity in presence of tap water, so as to form precipitates which are then separated/removed from said composition. Indeed, said precipitating agent allows to precipitate the heavy metal ions present in the compositions before the separation step. The precipitating agent binds to heavy metal ions, thereby forming non-soluble species, i.e. precipitates, which are separated from the composition by any usual conventional means such as a filter during said separation step. More particularly, it has been found that the addition of said precipitating agent before the separation step to a hypochlorite-containing composition allows to remove heavy metal ions from said composition in a more efficient way as compared to the same process without the addition of said precipitating agent before the separation step. In other words, the addition of said precipitating agent before the separation step improves the efficiency of said step, even at higher pH values.

The compositions obtainable by the process of the present invention have improved physical and chemical stability. A further advantage of the compositions obtainable by the process of the present invention is that in addition to their outstanding whitening action said compositions allow also good stain removal.

SUMMARY OF THE INVENTION

The present invention encompasses a process for the manufacture of an aqueous liquid bleaching composition having a pH of from 10 to 14 and comprising an alkali metal hypochlorite, a strong source of alkalinity and water. Said process includes the steps of:

mixing said alkali metal hypochlorite, said strong source of alkalinity and said water, adding a precipitating agent, or mixtures thereof, and thereafter separating the precipitates formed from said composition.

In a preferred embodiment of the process of the present invention a chelating agent capable of binding heavy metal ions is further added to said composition after the separation step.

DETAILED DESCRIPTION OF THE INVENTION

The present invention concerns the manufacture of a liquid aqueous bleaching composition.

The process of the present invention for the manufacture of an aqueous liquid bleaching composition, as described hereinafter, having a pH of from 10 to 14 and comprising an alkali metal hypochlorite, a strong source of alkalinity, and water, comprises the following steps.

In a first step, said aqueous liquid bleaching composition is prepared by mixing said alkali metal hypochlorite, said strong source of alkalinity, and water.

In a second step, a precipitating agent, or mixtures thereof is added.

The order in which the different ingredients are added is not critical for the present invention as long as the precipitating agent, or mixtures thereof, is added before the separation step, described thereinafter.

In a third step, the precipitates formed are then separated from said composition.

By "precipitates formed" it is meant herein any solid phase present in the compositions of the present invention, i.e. any kind of insoluble species resulting from the reaction of precipitating agents and/or hydroxides with metal ions such as heavy metal ions and/or calcium/magnesium. The precipitates formed thus include, for example, metal hydroxides and metal salts.

By "separating the precipitates formed" it is meant herein that any means known to remove a solid phase from a liquid phase may be used according to the present invention. Accordingly, the precipitates formed may be removed from the compositions of the present invention by settling and/or filtration and/or centrifugation. Filtration is preferred herein.

Filters suitable to be used in the process according to the present invention are any filters commercially available and known as decantation filters including cartridge filter, mesh filter, filter-cakes and the like.

The precipitating agents according to the present invention may be defined as any agent being capable of binding to heavy metal ions, thereby forming non-soluble salts, i.e. salts having a solubility product in water not higher than $10^{-4}$ at a temperature of 25° C., preferably not higher than $10^{-6}$ more preferably not higher than $10^{-8}$ and most preferably not higher than $10^{-10}$.

It has now been found that the addition of said precipitating agents before the separation step in a process for the manufacture of liquid aqueous hypochlorite-containing compositions according to the present invention strongly reduces the content of heavy metal ions in said compositions. Indeed, the present invention provides liquid aqueous hypochlorite-containing compositions which are substantially free of heavy metal ions.

By "substantially free of heavy metal ions" it is meant herein that the concentrations of different heavy metal ions in said compositions manufactured according to the present invention are very low, e.g. the level of Fe is not higher than 1 ppm, the level of Ni is not higher than 20 ppb, the level of Cu is not higher than 20 ppb, the level of Mn is not higher than 10 ppb, and/or the level of Co is not higher than 10 ppb.

Indeed, it has now been found that the addition of such a precipitating agent, or mixtures thereof, to the different ingredients of a hypochlorite-containing composition, in a process for manufacturing said hypochlorite-containing composition, before said composition undergoes a separation step, allows to provide a hypochlorite-containing composition with improved whiteness performance and/or fabric safety performance.

Actually, in the process of the present invention, said precipitating agents are added in excess so as to precipitate all the heavy metal ions as well as other species, such as other metal ions like calcium/magnesium, present in the composition manufactured according to said process, and to be further available to precipitate heavy metal ions and for instance calcium/magnesium present in the washing/bleaching solution, thereby further improving the whiteness and/or fabric safety performance of said composition when used to treat fabrics. The heavy metal ions as well as other metal ions, such as calcium/magnesium, present in the compositions manufactured according to the process of the present invention result from the raw materials and the tap water used in said process.

Examples of precipitating agents suitable for use herein are alkali metal salts of oxalate, phosphonate, borate, sesquicarbonate, selenure, vanadate, tellurure, thiocarbonate, polonure, or mixtures thereof. The preferred alkali metal salts of said precipitating agents are sodium oxalate, sodium phosphonate, sodium borate, sodium sesquicarbonate, sodium selenure, sodium vanadate, sodium tellurure, sodium thiocarbonate, sodium polonure, or mixtures thereof.

Particularly useful precipitating agents to be used herein further include silicate or carbonate salts, or mixtures thereof. The preferred alkali metal salts of silicate and carbonate are sodium silicate and sodium carbonate, both of which are commercially available, or mixtures thereof. Preferred compositions manufactured according to the process of the present invention comprise a mixture of sodium carbonate, sodium silicate and sodium oxalate.

Said silicate or carbonate salts allow also buffering of the pH of the present compositions throughout use, i.e. the pH of a diluted composition manufactured according to the process of the present invention is kept constant from the moment the dilution is completed and until said hypochlorite bleaching composition is started to be rinsed away from the fabrics to which it has been contacted. It is also suspected that the buffering of the hypochlorite compositions of the present invention reduces harshness to hands.

The compositions manufactured according to the process of the present invention comprise from 0.01% to 10% by weight of the total composition of each of the precipitating agents present, preferably from 0.01% to 7%, more preferably from 0.1% to 5% and most preferably from 0.2% to 3%.

The compositions manufactured according to the process of the present invention are physical and chemically stable.

By "chemically stable" it is meant herein that the hypochlorite bleaching compositions of the present invention should not undergo more than 25% loss of available chlorine after 10 days of storage at 50° C.±0.5° C. The % loss of available chlorine may be measured using the method described, for instance, in "Analyses des Eaux et Extraits de Javel" by 'La chambre syndicale nationale de L'eau de Javel et des produits connexes', Pages 9–10 (1984). Said method consists in measuring the available chlorine in the fresh compositions, i.e. just after they are made, and in the same compositions after 10 days storage at 50° C.

By "physically stable" it is meant herein that no phase alteration occurs upon prolonged periods of storage, such as 10 days at 50° C. By "phase alteration" it is meant herein any change in the physical properties of the solution phases, for example phase separation.

In a preferred embodiment of the process of the present invention a chelating agent capable of binding heavy metal ions may be added after the separation step of the process of the present invention to further remove residual heavy metal ions. Such chelating agents may be any chelating agent having a binding constant K to heavy metal ions defined as follows, or mixtures thereof:

when n=1, then $K>10^5$, preferably $K>5.10^5$ and more preferably $K>10^6$, when n=2, then $K>10^6$, preferably $K>5.10^6$ and more preferably $K>10^7$, when n=3, then $K>10^7$, preferably $K>5.10^7$ and more preferably $K>10^8$.

wherein n is the number of chelating agent molecules per heavy metal ion and wherein $K=(MLn)/(M)(L)^n$ and (MLn) is the concentration of heavy metal ion/chelating agent complexes, (M) is the concentration of free heavy metal ions, and (L) is the concentration of free chelating agents.

Adding said chelating agents after the separation step allows to use less of said chelating agents then would otherwise be required if they were added before the separation step in order to get a finished composition of the same purity. Indeed, when added before the separation step, said chelating agents interact with magnesium and/or calcium present in the composition, leaving thereby less chelating agents available to chelate the heavy metal ions present in said composition. It is further believed that, when added before the separation step, said chelating agents also interact with the precipitating agents, leaving thereby less chelating agents available to chelate the heavy metal ions present in said composition as well as less precipitating agents available to precipitate the heavy metal ions as salts.

It has now been found that the precipitating agent, or mixtures thereof, added before the separation step and the chelating agent, or mixtures thereof, added after said separation step of the process of the present invention, act together so as to provide a hypochlorite-containing composition which is substantially free of heavy metal ions. Indeed, when adding said chelating agent after said separation step in the process of the present invention as described hereinbefore, residual heavy metal ions which have not been precipitated by said precipitating agent and removed from said composition during said separation step, are chelated, i.e. inactivated.

Examples of such chelating agents are polycarboxylic acid of pyridine or salts thereof having one of the following formulas:

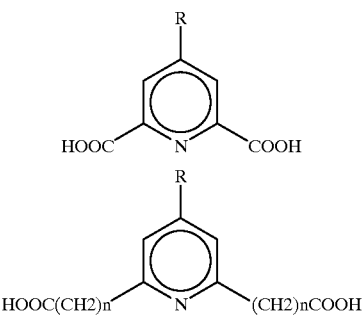

in which R is hydrogen, a halogen atom, a hydroxyl group, an amino group, a carboxylic group or a short-chain alkyl group (C1–C4) and n is 1 or 2. Preferred herein are the polycarboxylic acid derivatives of pyridine selected from the group of dipicolinic acid (2,6-pyridendicarboxylic acid) and derivatives thereof obtained by substitution of the hydrogen in para position with a halogen, a carboxylic group or a short-chain alkyl group (C1–C4).

Said chelating agents to be used herein are stable to hypochlorite and to high alkalinity. By "stable to hypochlorite and to high alkalinity" it is meant herein that the concentration of said chelating agents does not change after a time period of two months at room temperature.

The compositions manufactured according to the process of the present invention comprise from 0.01% to 5% by weight of the total composition of said chelating agent, or mixtures thereof, preferably from 0.01% to 3%, more preferably from 0.01% to 2% and most preferably from 0.01% to 1%.

As a further essential feature, the compositions manufactured according to the process of the present invention comprise an alkali metal hypochlorite, or mixtures thereof. Various forms of alkali metal hypochlorite are commercially available and, although this is not critical for the present invention, it is preferred herein to use sodium hypochlorite. The compositions manufactured according to the present invention comprise a bleaching amount of alkali metal hypochlorite, which typically represents from 0.1% to 10% by weight of the total composition, based on active chlorine, of alkali metal hypochlorite. Preferred compositions herein comprise from 3% to 6% of alkali metal hypochlorite.

As another essential feature, the compositions manufactured according to the process of the present invention comprise a strong source of alkalinity, or mixtures thereof. The compositions manufactured according to the present invention comprise from 0.04% to 2% by weight of the total composition of said strong source of alkalinity, or mixtures thereof, preferably of from 0.1% to 1.5% by weight and more preferably of from 0.2% to 0.9% by weight. Examples of strong sources of alkalinity are alkali metal hydroxides, such as potassium and/or sodium hydroxide, or alkali metal oxides such as sodium and/or potassium oxide.

Accordingly, the compositions manufactured according to the process of the present invention have a pH of from 10 to 14, preferably from 11 to 14 and more preferably from 12 to 14. It is in the alkaline range that the optimum stability and performance of the hypochlorite is obtained.

The compositions manufactured according to the process of the present invention further comprise water in the necessary amount in order to complete said compositions. The water used in the process of the present invention is tap water, i.e. non demineralized water.

The compositions manufactured according to the process of the present invention may further comprise optional ingredients including bleach-stable surfactants, organic or inorganic alkalis, perfumes, bleach-stable perfume solubilizer, dyes, optical brighteners, solvents, and the like. If present said optional ingredients are added to the compositions manufactured according to the process of the present invention at any step, i.e. before or after the separation step.

The compositions manufactured according to the process of the present invention are used in diluted form in laundry application. The expression "use in diluted form" herein includes dilution by the user, which occurs for instance in hand laundry applications, as well as dilution by other means, such as in a washing machine. Typical dilution levels are of from 0.5% to 20% for hand laundry application and 0.1% to 10% in a washing machine.

The present invention will be further illustrated by the following examples.

EXAMPLES

The following compositions are made according to the process of the present invention:

| Compositions | 1 | 2 | 3 | 4 |
|---|---|---|---|---|
| Sodium hypochlorite | 5.0 | 5.0 | 5.0 | 5.0 |
| Sodium hydroxide | 1.0 | 1.0 | 1.0 | 1.0 |
| Sodium carbonate | 1.3 | 1.3 | 1.3 | 1.3 |
| Sodium silicate | / | / | 1.0 | / |
| sodium oxalate | 1.0 | / | 1.0 | 1.0 |
| Sodium dipicolinate | / | / | / | 1.0 |
| Water & minors | | 100% | | |
| pH | 13 | 13 | 13 | 13 |

In one step of the process according to the present invention sodium hypochlorite, sodium hydroxide, sodium carbonate and/or sodium oxalate if present, and/or sodium silicate if present, and tap water are mixed.

In the next step the precipitates formed are separated from said compositions by filtering said compositions with a decantation filter.

And finally where a chelating agent is added (composition 4), said chelating agent (dipicolinic acid) is added after the filtration step.

The above mentioned process is conducted at room temperature, i.e. at about 25° C.

The above compositions obtained according to the process of the present invention showed improved whiteness and/or improved fabric safety performance when used to bleach fabrics. Also said compositions exhibit excellent chemical and physical stability.

I claim:

1. A process for the manufacture of a stabilized aqueous hypochlorite solution, said process comprising the steps of:
   a) mixing a source of alkali metal hypochlorite and a source of alkalinity in water to form an alkaline hypochlorite solution;
   b) adding to said solution a precipitating agent, said precipitating agent selected from the group consisting of the alkali metal salts of oxalate, phosphonate, borate, sesquicarbonate, silicate, thiocarbonate, and mixtures thereof;
   c) precipitating heavy metal ions which are present as an impurity by forming a precipitate;
   d) filtering said solution to remove said precipitate; and
   e) adding to said solution a chelating agent, said chelating agent having a binding constant, K, wherein:
      i) when said chelating agent binds one atom of heavy metal per molecule of chelating agent, K is greater than $10^5$;
      ii) when said chelating agent binds two atoms of heavy metal per molecule of chelating agent, K is greater than $10^6$;
      iii) when said chelating agent binds three atoms of heavy metal per molecule of chelating agent, K is greater than $10^7$;
   to form a stabilized alkaline hypochlorite solution comprising from 0.01% to 10% by weight, of hypochlorite based on the amount of active chlorine; wherein the pH of said solution is from 10 to 14.

2. A process according to claim 1 wherein said precipitating agent is sodium oxalate.

3. A process according to claim 1 wherein said precipitate is removed by decanting said precipitate.

4. A process according to claim 1 wherein said alkali metal hypochlorite is sodium hypochlorite.

5. A process according to claim 1 wherein said source of alkalinity is sodium hydroxide.

6. A process according to claim 1 wherein said stabilized hypochlorite solution has a pH of greater than 11.

7. A process according to claim 1 wherein said stabilizing agent has the formula:

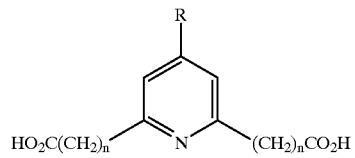

wherein R is hydrogen, halogen, hydroxyl, amino, carboxy, $C_1-C_4$ alkyl, or mixtures thereof; n is from 0 to 2.

8. A process according to claim 1 wherein said precipitating agent has a solubility product less than $10^{-4}$ at 25° C.

9. A process according to claim 8 wherein said precipitating agent has a solubility product less than $10^{-6}$ at 25° C.

10. A process according to claim 9 wherein said precipitating agent has a solubility product less than $10^{-8}$ at 25° C.

11. A process according to claim 1 comprising from 0.01% to 10% by weight, of a precipitating agent.

12. A process according to claim 11 comprising from 0.01% to 7% by weight, of a precipitating agent.

13. A process according to claim 12 comprising from 0.01% to 5% by weight, of a precipitating agent.

14. A process according to claim 13 comprising from 0.2% to 3% by weight, of a precipitating agent.

15. A process for the manufacture of a stabilized aqueous hypochlorite solution, said process comprising the steps of:
   a) mixing a source of sodium hypochlorite and sodium hydroxide in water to form a solution of sodium hypochlorite having a pH of from 10 to 14;
   b) adding to said sodium hypochlorite solution a precipitating agent, said precipitating agent selected from the group consisting of sodium oxalate, sodium silicate, and mixtures thereof; and precipitating one or more heavy metal ions which are present by forming a precipitate thereof;
   c) filtering said solution to remove said heavy metal ion precipitate; and
   d) adding to said solution a stabilizing agent in the form of a chelating agent, wherein said chelating agent has the formula:

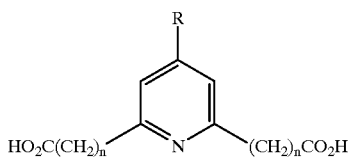

wherein R is hydrogen, halogen, hydroxyl, amino, carboxy, $C_1$–$C_4$ alkyl, or mixtures thereof; n is from 0 to 2; thereby forming a stabilized alkaline sodium hypochlorite solution wherein said solution comprises from 0.01% to 10% by weight, of hypochlorite based on the amount of active chlorine.

16. A process according to claim 15 comprising from 0.01% to 10% by weight, of a precipitating agent.

17. A process according to claim 16 comprising from 0.2% to 3% by weight, of a precipitating agent.

18. A process for the manufacture of a stabilized aqueous hypochlorite solution, said process comprising the steps of:
   a) mixing a source of sodium hypochlorite and sodium hydroxide in water to form a solution of sodium hypochlorite having a pH of from 10 to 14;
   b) adding to said sodium hypochlorite solution a precipitating agent, said precipitating agent selected from the group consisting of sodium oxalate, sodium silicate, and mixtures thereof; and precipitating one or more heavy metal ions which are present by forming a precipitate thereof;
   c) filtering said solution to remove said heavy metal ion precipitate; and
   d) adding to said solution a stabilizing agent in the form of a chelating agent, wherein said chelating agent has a binding constant, K, wherein:
      i) when said chelating agent binds one atom of heavy metal per molecule of chelating agent, K is greater than $10^5$;
      ii) when said chelating agent binds two atoms of heavy metal per molecule of chelating agent, K is greater than $10^6$;
      iii) when said chelating agent binds three atoms of heavy metal per molecule of chelating agent, K is greater than $10^7$;

thereby forming a stabilized alkaline sodium hypochlorite solution provided said solution comprises from 0.01% to 10% by weight, of hypochlorite based on the amount of active chlorine.

19. A process according to claim 18 wherein said stabilizing agent has the formula:

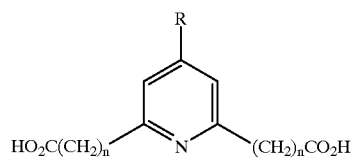

wherein R is hydrogen, halogen, hydroxyl, amino, carboxy, $C_1$–$C_4$ alkyl, or mixtures thereof; n is from 0 to 2.

20. A process according to claim 18 wherein said precipitating agent is sodium oxalate.

* * * * *